United States Patent Office 3,519,200
Patented July 7, 1970

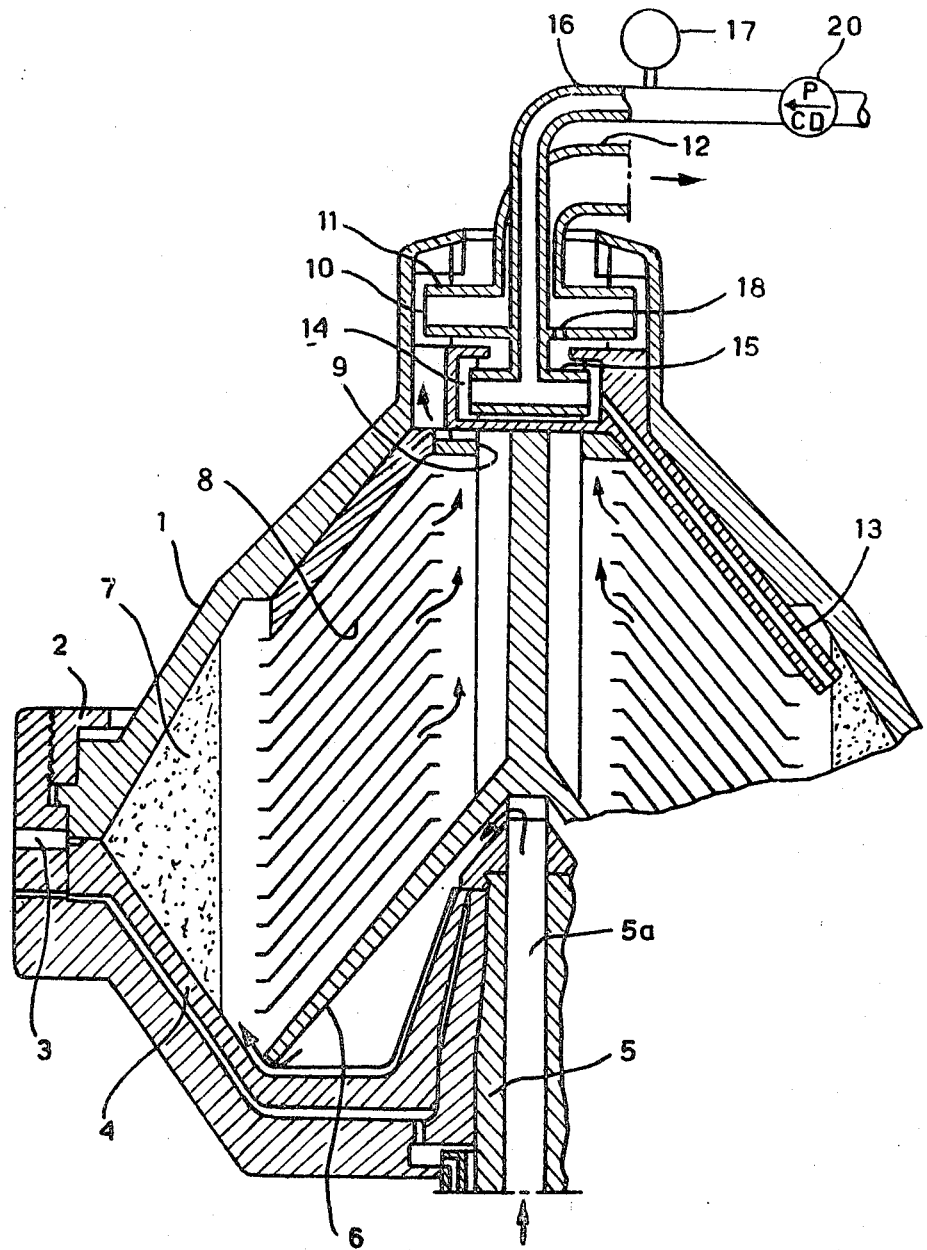

3,519,200
METHOD FOR INDICATING CHANGES OF LIQUID PRESSURE IN A CENTRIFUGAL SEPARATOR
Carl-Goran Nilson, Tullinge, Sweden, assignor to Alfa-Laval AB, Tumba, Sweden, a corporation of Sweden
Filed Nov. 2, 1967, Ser. No. 680,218
Claims priority, application Sweden, Oct. 10, 1967, 13,825/67
Int. Cl. B04b *15/00, 11/00*
U.S. Cl. 233—19     3 Claims

ABSTRACT OF THE DISCLOSURE

The rotor of the centrifugal separator has an inlet for the mixture to be separated and at least one outlet for a separated liquid, and a duct opens into the rotor at a certain radius where changes in the liquid pressure occur during operation, the duct extending from the rotor to a measuring instrument for indicating those pressure changes. A fluid is pumped through the duct and into the rotor, preferably continuously, the fluid being one which will not harm or contaminate the measuring instrument. Thus, the measuring instrument is subjected only to the fluid in the duct but provides the desired indication of the liquid pressure changes in the rotor by responding to resulting changes in the fluid pressure as the fluid is pumped.

---

Centrifugal separators of different kinds often require means operable during the separating operation to indicate the radial position of the liquid surface formed within the rotor or (in the case of hermetically sealed centrifugal separators) the liquid pressure prevailing within the rotor. Such means generally comprise a pressure gauge connected outside the rotor to a duct extending into the rotor to a predetermined point or radius therein, liquid separated within the rotor being allowed to flow into the duct to the instrument for actuating the latter.

The indications provided by such an instrument may be of interest for different purposes. For example, they may be used for automatically or manually controlling the supply of liquid to be separated to the rotor. Also, in the case of so-called sludge centrifuges, the intermittent discharges of the sludge may be controlled by means of these indications.

The above-described system for indicating the liquid pressure in the rotor of a centrifugal separator is not suitable, however, when separating some kinds of liquids. When separating mineral oils, for instance, packings of rubber at the pressure gauge will very soon be destroyed and have to be replaced. Also in connection with separation of food stuffs, such as milk, fruit juices, etc., the aforesaid system has proved unsuitable. Particularly in certain countries where the hygienical requirements in the food industry are very high, complications have arisen in attempting to clean, rapidly and effectively, the pressure gauge and its fastening means so as to remove deposits of the separated liquid after completion of a separating operation.

Attempts have been made to overcome these problems within the food industry. According to one arrangement, a membrane is mounted between the indicating instrument and the pressure transmitting duct, a harmless liquid being enclosed between the membrane and the instrument. Thus, the instrument can indicate the liquid pressure prevailing within the duct, without coming into contact with the separated liquid therein. However, while this prior arrangement represents some improvement, the provision of a membrane in the duct is an awkward complication, and the membrane will naturally be polluted by the separated liquid almost to the same extent as the pressure gauge if the membrane is omitted.

The principal object of the present invention is to provide an absolutely hygienic method for indicating changes in the liquid pressure in the rotor of a centrifugal separator.

According to the invention, a harmless fluid is pumped through said duct and into the centrifugal rotor, this fluid being one which will not attack or contaminate the indicating instrument but will actuate it in response to changes in the liquid pressure occurring at the aforesaid radius within the rotor. This eliminates every possibility of contact between the separated liquid and the measuring instrument or any other means connected to the duct extending into the rotor.

Preferably, the fluid is pumped continuously so that there is no need for a non-return valve or the like in the duct. Further, when supplying the fluid continuously, the internal surface of the duct along the whole of its length can be constantly kept free from direct contact with the separated liquid, which quite eliminates the whole problem of internal cleaning of the duct.

The pumped fluid is preferably a gas so as to avoid dilution of the separated liquid. Of course, a gas may be used which is soluble in the separated liquid, and a gas of this kind can be used in connection with centrifuges of the hermetically sealed type.

The invention is described more in detail below when used in connection with a so-called sludge centrifuge. The description is made with reference to the accompanying drawing in which the single illustration is a vertical sectional view of such a centrifuge embodying one form of the invention.

In the drawing, a centrifugal rotor 1 comprises two parts which are held together by a locking ring 2. In the rotor periphery are sludge outlet openings 3 which are opened and closed in a conventional manner by a valve piston 4. The rotor is carried and driven by a hollow shaft 5 having a central channel 5a through which the liquid and sludge mixture to be separated is supplied to the separating chamber of the rotor. The mixture enters this chamber by passing under the lower edge of a distributor 6. The centrifugally separated sludge accumulates in a sludge space 7, while the purified liquid passes through a disc set 8 inwardly toward the vertical axis of the rotor and leaves the separating chamber by way of an overflow outlet 9. From this outlet, the liquid flows outwardly into a paring chamber 10 and is discharged by means of a stationary paring disc 11. This disc is connected to an outlet duct 12 for the purified liquid.

The rotor is provided with an indicating pipe 13, the bore or channel of which extends outwardly into the sludge space 7. This pipe opens at its inner end into a chamber 14 in which a radially extending pipe 15 is located. The pipe 15 forms the outlet end of a duct 16, in which a conventional pressure or flow sensing instrument 17 is provided. Through a conventional operating connection (not shown), the instrument 17 controls the movements of valve piston 4 so as to effect sludge discharge automatically when the sludge level is sufficient in the space 7.

As shown in the drawing, the paring disc 11 is provided with an opening 18. Through this opening a small quantity of the separated liquid pared out by the paring disc 11 is continuously passed down into the chamber 14.

A gas, for instance air, is continuously forced into the rotor through the duct 16 and pipe 15, by means of a pump 20.

In the operation of the device, the pressure prevailing in the duct 16 will correspond to the amount of liquid covering the pipe 15 in the chamber 14. The instrument 17 thus shows the pressure prevailing within the rotor at the outlet opening or openings of the pipe 15.

The small quantity of separated liquid passing through the opening 18 into the chamber 14 is used as an indicating liquid for indicating the degree of sludge deposition in the sludge space 7. As long as the opening at the outer end of the indicating channel or pipe 13 is free, no substantial pressure change will take place in the duct 16, for the quantity of liquid supplied to the chamber 14 through the opening 18 then flows through the pipe 13 into the separating chamber of the rotor. The pressure sensing instrument 17 will thus indicate a relatively small pressure, which will be insufficient to cause this instrument to effect automatic discharge of sludge through actuation of piston valve 4. However, when the sludge deposition at the outer end of the pipe 13 becomes sufficiently great, the quantity of liquid supplied through the opening 18 into the chamber 14 will not be able to escape past the sludge plug formed in the outer end of pipe 13 but will accumulate in chamber 14 and thereby cover the outer portions of pipe 15. The sensing instrument 17 will then indicate a substantially larger pressure, the pressure change being sufficient to effect a sludge discharge.

The indicating instrument 17 may be of different types. It may be of the type which indicates primarily the magnitude of a pressure change or the type which indicates primarily the magnitude of the change in flow rate, it being understood that both the pressure and the flow rate in duct 16 will change substantially in response to clogging of the indicating channel 13 by sludge.

The device will operate similarly if conventional hermetic sealing is used instead of the paring disc 11. The pipe 15 may be allowed, if desired, to rotate with the rotor and the vertical part of duct 16, the latter part being rotatably sealed to the horizontal part of duct 16. The duct may, of course, open through its outlet pipe 15 at any desired radius of the rotor.

The fluid supplied through the duct 16 by pump 20 may be either a gas or a liquid. If a liquid is used in connection with a centrifuge of the type shown in the drawing, its specific gravity is preferably less than that of the separated liquid, the lighter liquid then being removed from the rotor, as by way of an overflow outlet.

I claim:

1. In the operation of a centrifugal separator including a hollow rotor driven about an axis and having an inlet for a mixture to be separated and at least one outlet for a separated liquid, the separator also including a duct opening into the rotor at a predetermined radius from said axis and extending from the rotor to an instrument for indicating changes in the liquid pressure at said radius, the method which comprises pumping a gas through the duct and into the rotor, whereby the instrument indicates said liquid pressure changes by responding to resulting changes in the gas pressure while said gas is being pumped.

2. The method according to claim 1, in which said pumping is effected continuously.

3. The method according to claim 1, in which said liquid is a food stuff.

References Cited

UNITED STATES PATENTS 3,396,910    8/1968    Steinacker ---------- 233—20

ROBERT W. JENKINS, Primary Examiner

FO-1050
(5/69)

UNITED STATES PATENT OFFICE
CERTIFICATE OF CORRECTION

Patent No. 3,519,200        Dated July 7, 1970

Inventor(s)  Carl-Goran Nilson

It is certified that error appears in the above-identified patent and that said Letters Patent are hereby corrected as shown below:

Col. 1, line 20, change "fluid" to --gas--.

Col. 1, line 21, change "fluid" to --gas--.

Col. 1, line 24, change "fluid" to --gas--.

Col. 1, line 26, change "fluid" to --gas--.

Col. 1, line 27, change "fluid" to --gas--.

Col. 2, line 7, change "fluid" to --gas--.

Col. 2, line 8, change "fluid" to --gas--.

Col. 2, line 16, change "fluid" to --gas--.

Col. 2, line 18, change "fluid" to --gas--.

Col. 2, line 23, delete "The pumped fluid is preferably a gas so as to avoid" and insert --The use of gas as the pumped fluid avoids--.

Col. 3, line 31, "channed" should be --channel--.

Col. 4, cancel lines 5 through 10.

Signed and sealed this 13th day of April 1971.

(SEAL)
Attest:

EDWARD M. FLETCHER, JR.
Attesting Officer

WILLIAM E. SCHUYLER, JR.
Commissioner of Patents